United States Patent
Ng et al.

[11] Patent Number: 6,157,978
[45] Date of Patent: Dec. 5, 2000

[54] MULTIMEDIA ROUND-ROBIN ARBITRATION WITH PHANTOM SLOTS FOR SUPER-PRIORITY REAL-TIME AGENT

[75] Inventors: David Way Ng, San Francisco; Harish Narian Mathur, San Jose, both of Calif.

[73] Assignee: NeoMagic Corp., Santa Clara, Calif.

[21] Appl. No.: 09/226,398

[22] Filed: Jan. 6, 1999

Related U.S. Application Data

[63] Continuation-in-part of application No. 09/153,950, Sep. 16, 1998.

[51] Int. Cl.[7] ................................................ G06F 13/362
[52] U.S. Cl. .......................... 710/240; 710/243; 710/117
[58] Field of Search .................... 710/113–125, 240–244

[56] References Cited

U.S. PATENT DOCUMENTS

| | | | |
|---|---|---|---|
| 4,470,110 | 9/1984 | Chiarottino et al. | 364/200 |
| 5,506,968 | 4/1996 | Dukes | 395/728 |
| 5,528,513 | 6/1996 | Vaitzblit et al. | 709/103 |
| 5,528,767 | 6/1996 | Chen . | |
| 5,530,848 | 6/1996 | Gilbert et al. | 395/600 |
| 5,581,713 | 12/1996 | Myers et al. | 395/299 |
| 5,689,656 | 11/1997 | Baden et al. | 710/116 |
| 5,983,302 | 11/1999 | Christiansen et al. | 710/113 |
| 5,999,534 | 12/1999 | Kim | 370/395 |
| 6,026,230 | 2/2000 | Lin et al. | 395/500.34 |
| 6,061,504 | 5/2000 | Tzelnic et al. | 395/200.49 |

*Primary Examiner*—Paul R. Myers
*Attorney, Agent, or Firm*—Stuart T. Auvinen

[57] ABSTRACT

Low-latency arbitration is provided for a super-priority communications device such as modems and ISDN/DSL routers, LAN switches and routers. Phantom arbitration slots are inserted between each pair of permanent slots. When a request from the super-priority agent is received, the next phantom slot is used to service the request. The initial latency is just one slot period rather than the whole arbitration loop. Other phantom slots are skipped until the same phantom slot is again activated at the same point in the arbitration loop during subsequent rounds of arbitration. Thus only the initial latency is reduced; subsequent requests from the super-priority agent are handled just once for each arbitration cycle. The low initial latency allows the communications device to quickly respond to an incoming call. Other real-time agents are assigned a fixed slot in a round-robin arbitration. The last arbitration slot is used by all non-real-time agents. The last time slot uses a priority arbiter to grant access in a priority order to the non-real-time agents. A timer is used to limit the time that the last arbitration slot services non-real-time agents. The next arbitration loop then begins with the first real-time agent or a phantom slot. The amount of access time given the non-real-time agents is maximized while the real-time agents are ensured access within the maximum loop period.

20 Claims, 6 Drawing Sheets

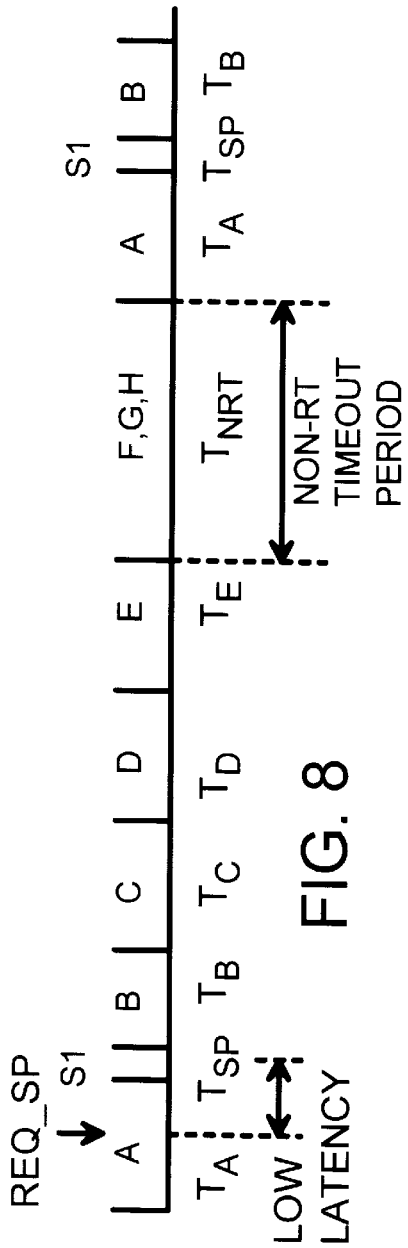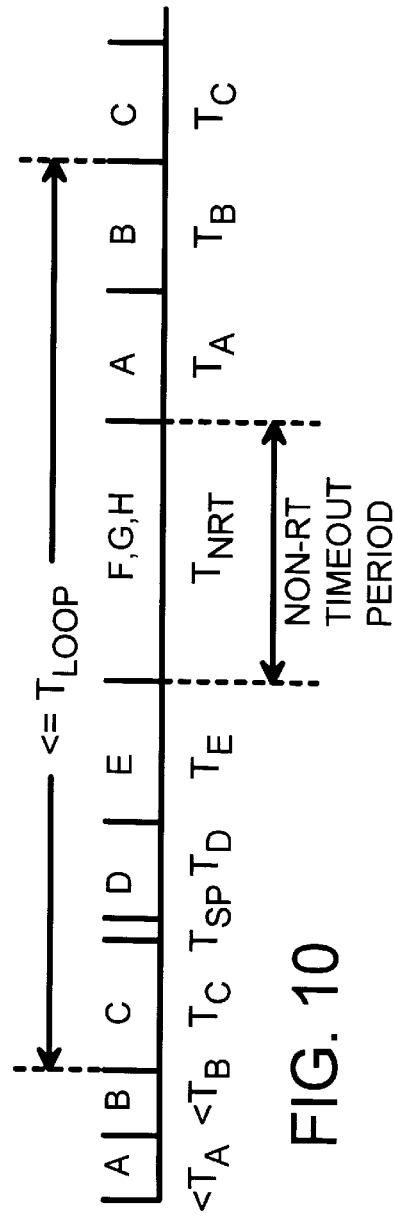

MULTIMEDIA ROUND-ROBIN ARBITRATION WITH PHANTOM SLOTS FOR SUPER-PRIORITY REAL-TIME AGENT

RELATED APPLICATION

This application is a continuation-in-part (CIP) of the co-pending application for "Multimedia Arbitration Using Fixed Round-Robin Slots for Real-Time Agents and a Timed Priority Slot for Non-Real-Time Agents", U.S. Ser. No. 09/153,950, filed Nov. 16, 1998.

FIELD OF THE INVENTION

This invention relates to memory arbitration, and more particularly to arbitration with a low-latency multimedia agent.

BACKGROUND OF THE INVENTION

The increasing complexity of computer systems often requires sharing of resources among many requestors or agents. The resource is often limited in its ability to service the agents, so some type of arbitration is necessary when two or more agents make simultaneous requests for the resource. Some resources such as for communications may require low latency while other resources such as for graphics may require high bandwidth.

Many types of arbitration have been used. A priority can be assigned to each agent, and when two or more agents make simultaneous requests, then the higher-priority agent is chosen to access the resource while the lower-priority agent is delayed. Such priority-based arbitration maximizes performance of higher-priority agents at the expense of lower-priority agents.

Another type of arbitration is fixed or round-robin arbitration. Each agent is assigned a time-slot or position in a loop, and is given highest priority during its time-slot or position in the loop. This type of arbitration is considered "fair" since all agents have equal access to the resource. Latency can be a problem since an agent may have to wait for its time-slot or turn in the loop. Various combinations with priority arbitration are possible to give some agents higher priority than others.

An area that is experiencing rapid technical advances is multimedia for computers, especially for personal computers (PCs). Multimedia includes graphics, video, and sound produced and manipulated by a computer. Different agents are used to process the different multimedia components.

Integration of PC telecommunications and data communication is also a rapidly-advancing field. PCs are often connected to telephone lines by modems or terminal adapters, and there is increased flow of multi-media data on Local Area Networks (LAN's). Such communications devices may need to respond to an incoming request quickly, with a low latency.

SINGLE MULTIMEDIA/COMM MEMORY DESIRABLE—FIG. 1

While each agent may use its own memory, it is desirable to share a common memory since memory space can be allocated among the different agents. Different multimedia modes that are more graphics or audio-intensive can have the multimedia memory re-allocated to provide more space for the graphics or audio agents. The memory may also be shared by communications devices. Thus a common multimedia/communications memory is desirable.

FIG. 1 is a diagram of a graphics memory shared by multiple multimedia and communications agents. Multimedia memory 10 provides storage for one or more graphics frame buffers, which are pixel bit-mapped buffers of the visual image displayed on a screen to a user. Multimedia memory 10 also stores other buffers, such as for input video data, audio, and 3-dimensional (3D) shapes. Text or font buffers may also be stored in multimedia memory 10. Communications buffers may also be located in multimedia memory 10.

User display screens need to be sent a stream of pixels from a frame buffer in multimedia memory 10. This is known as display refresh. CRT FIFO 30 is a first-in-first-out buffer that is filled with a portion of the frame buffer stored in multimedia memory 10. As the pixels are written to cathode-ray tube (CRT) display 32, CRT FIFO 30 empties out and has to be re-filled with pixels from the frame buffer in multimedia memory 10. The stream of pixels from CRT FIFO 30 may also be converted to a flat-panel format by a gray-scale converter and stored in LCD buffer 26, for display on flat-panel liquid-crystal display (LCD) 34. LCD FIFO 26 may also be written directly from multimedia memory 10.

A second CRT monitor may be connected to the multimedia PC. Second CRT FIFO 31 buffers pixels for display on second CRT display 33. Different images can be displayed on the two CRT displays 32, 33, such as text on one display and graphics on the other.

Sound may be mixed, stored or generated digitally and later converted to analog voltages to drive speakers. Audio FIFO 24 buffers an audio stream that is stored in multimedia memory 10 before being converted to analog voltages to drive one or more speakers. The audio stream may be extracted from a microphone attached to video camera 38, which sends audio and video data over a zoom-video ZP port to ZV FIFO 16, which is later separated into video and audio streams and stored in larger buffers in multimedia memory 10. Audio clips captured from a sound card or microphone and stored in main memory or on a disk can be input to multimedia memory 10 from the host processor or bus through host FIFO 14.

An optical disk such as digital-versatile disk (DVD) 36 includes both video and audio data, which is typically stored in an MPEG-2 format. MPEG-2 FIFO 28 receives the decoded data from DVD 36 under control of DVD controller 12, which sends the audio and video streams to multimedia memory 10. Data sent to multimedia memory 10 can first be buffered and later combined with the frame buffers for display on displays 32, 33, 34, or written directly to the frame buffers. The data may also consist of x,y,z coordinates for 3D objects (wire-frames) which are rotated, transformed, textured, and shaded by 3D engine 18, and converted to a 2D image seen from the user's perspective. The 2D image is then written to the frame buffer for display. Bit-block-transfer BITBLT engine 22 performs block manipulations on 2-dimensional blocks such as windows.

Communications device 19 is a dial-up modem, an Integrated Services Digital Network (ISDN) terminal adaptor, or a Digital-Subscriber Line (DSL) modem that connects the PC to a network such as the telephone network. Data received from the phone line by communications device 19 is stored in temporary buffers in multimedia memory 10 before being processed by the PC's microprocessor or other device. Transmit buffers can also be stored in multimedia memory 10 and sent to communications device 19 for transmission over the phone line. While bandwidth requirements may be limited by the phone line, initial responses such as when a new call is established must be quick. Thus communications device 19 requires a low initial latency but a moderate bandwidth.

Since so many buffers are needed in the multimedia PC, a large multimedia memory is required. Dynamic-random-access memory (DRAM) is preferred so that 2–20 Mbytes is available. DRAM refresh controller 20 periodically refreshes each memory row in multimedia memory 10 by performing a read to restore charge levels on memory-cell capacitors.

While such a large, multi-use multimedia memory is desirable, each of the FIFOs that input or output data to multimedia memory 10 need to access the memory, as does communications device 19. Access by each device must be carefully controlled and limited so that graphics refresh is not stalled, and image distortions occur. Agents such as the CRT and LCD FIFOs and audio FIFO are real-time agents that must not run out of data; otherwise image or audio distortion occur. Likewise, DRAM refresh must occur on time or data may be lost. The ZV port must be read or camera data is lost. These real-time agents are critical and must have access to multimedia memory 10.

Other agents are not real-time agents and can withstand being prevented access to multimedia memory 10 for periods of time. Reading the DVD disk can be paused. The host CPU can wait until the multimedia memory is free to update display information. The 3D and BITBLT engines can pause until memory bandwidth is available. These non-real-time agents do not have to access multimedia memory 10 within any predetermined period of time, but overall system performance can suffer when their access is limited.

The communications device must be responded to quickly when a new call is being established so that the call is not missed. As higher-speed technologies such as V.34, V.90, or DSL are used, call-establishment time is reduced and lower initial latencies are required. The communications device is thus a low-latency requestor. To meet this low latency requirement, the communications device must be given a very high priority. Such a low-latency device is considered a super-priority (SP) agent.

FIXED-LOOP ARBITRATION—FIG. 2

FIG. 2 is a diagram of a fixed arbitration loop with a super-priority agent. Real-time agents are assigned a higher priority and are located early in an arbitration loop. A super-priority (SP) agent such as a communications device is assigned the first priority slot A. Agents B, and C are the next highest-priority agents, and can be used for CRT display FIFOs to ensure that display refresh is given highest priority. Audio and DRAM refresh can occupy arbitration slots D and E. Lower-priority agents such as 3D and BITBLT engines and host access are assigned the low-priority arbitration slots F, G, H.

During an arbitration loop, agent A is allowed to fill its FIFO, then agent B fills its FIFO, and then agent C fills its FIFO. Next agents D and E are allowed access to the memory. Finally the low-priority agents F, G, H may have access. Since the high-priority agents A, B, C are real-time agents they must have access again before their FIFOs become empty. This amount of time can be calculated from the FIFO size and the rate pixels are sent to the display, which depends on the graphics mode and resolution. The amount of time until real-time agent A again needs to access the memory is called the loop or time-out period.

When the FIFOs are not being rapidly emptied, such as during the vertical retrace period, or when no communications is occurring, little time is needed by agents A, B, C. Much time is left for low-priority agents F, G, H. However, during high-bandwidth periods such as during a data call or when a horizontal line of pixels is being drawn to the display, agents A, B, C may require most of the loop time. This leaves little or no time for low-priority agents F, G, H. Once the loop timeout is reached, the agent being serviced must relinquish access to allow agent A to refill its FIFO. Agents at the end of the loop may not have access at all for several loop periods. This is indicated by the dashed timeout (TO) lines in the diagram.

LOOP VARIATIONS CAUSE REAL-TIME FAILURES—FIG. 3

FIG. 3 shows that some agents such as a super-priority agent may not be serviced quickly enough despite a fixed-loop timeout. Each of the agents A–G have a period of time for accessing a memory in the upper waveform of FIG. 3. Agent H, the last agent, is not able to access the memory since the timeout occurs before it has a turn to access the memory.

The period of time from the beginning of agent A's access to the next time agent A is given access is the loop or timeout period. This timeout period is carefully calculated to ensure that agent A does not run out of data from its FIFO before its next access.

Agent A, the super-priority agent, may require a minimum latency for its initial handshake, re-training and seamless rate changes in response to an incoming call. While during normal operation the communications FIFO may be serviced frequently enough once every timeout period, the low initial latency may be shorter than the timeout period. For example, when a super-priority (SP) communications request occurs as shown while agent C is being serviced, the request is not serviced until the beginning of the next loop, when agent A is again serviced. The delay from when the SP request is received during agent C servicing until agent A's service time may exceed the allowed latency. A latency error may occur, and the call may be disconnected. Simply assigning the super-priority agent to slot A does not provide low latency.

Although agent A, the first agent in the loop, is guaranteed access within the timeout period, other high-priority agents are not always given access in the same amount of time. In the lower waveform of FIG. 3, agents A and B do not require much access time, perhaps not needing access at all. This can occur during vertical retrace periods. The other agents C—H each have access to the memory during the first timeout period.

Even though agents A and B required little time, the full timeout period is used. Low-priority agents F, G, H use all the available time in the timeout period, perhaps having been starved for a long period of time and having a large backlog of access requests.

In the next round of arbitration, agents A and B require more time. This delays agent C from starting access until a later time in the arbitration cycle. The total time from the beginning of agent C's access in the first arbitration period to agent C's beginning of access in the second arbitration period is longer than usual. This effective loop period for agent C is larger than the nominal timeout period, since agent C started early in the first round and later in the second round. Agent C can fail since it cannot refill its FIFO within the timeout period.

Such a fixed-timeout-period arbitration loop ensures timely access for the first agent in the loop, but other agents have no such guarantee. Advanced multimedia systems may have several critical real-time agents, each of which must be serviced within a fixed period of time. FIFOs for these other real-time agents may have to be enlarged to account for arbitration-loop skew. Larger FIFOs are undesirable.

What is desired is an arbitration scheme for multiple real-time agents, including a low-latency agent. The low-latency agent must be assigned a super priority so that it can be responded to in a short time. Each of the critical real-time agents should have access to a common resource within a predefined period of time to prevent underflow failures. It is desirable to have many multimedia agents and a communications device access a common multimedia memory. The common multimedia memory could be used for multiple frame buffers, each being read by a high-priority agent. The multimedia memory also could be read by a high-priority audio agent for real-time audio playback. Performance of lower-priority agents that are not real-time agents should still be maximized.

SUMMARY OF THE INVENTION

A cascaded arbiter has a plurality of request inputs from real-time agents that must be serviced periodically after a loop period of time. A plurality of request inputs from non-real-time agents can be serviced after irregular periods of time, while a request input from a super-priority agent must be serviced initially after a short period of time that is less than the loop period of time.

A fixed sequencer is coupled to the plurality request inputs from the real-time agents. It grants access to a shared resource to each of the real-time agents in a predetermined sequence. A phantom-slot inserter is coupled to the fixed sequencer and to the request input from the super-priority agent. It inserts a phantom slot for servicing the super-priority agent into the predetermined sequence. The phantom slot is inserted after an initial request is received so that the super-priority agent is serviced initially after the short period of time being less than the loop period of time.

A final-slot signal is generated by the fixed sequencer after all real-time agents activating a request input are serviced by granting access to the shared resource. A timer is coupled to the fixed sequencer. It counts a final period of time from activation of the final-slot signal. The timer generates a time-out signal when the final period of time counted reaches a predetermined timeout value.

A priority arbiter is coupled to the plurality of request inputs from non-real-time agents and to the fixed sequencer. It grants access to the shared resource to non-real-time agents in a priority order. The priority arbiter grants access after receiving the final-slot signal from the fixed sequencer. The priority arbiter does not granting access after the time-out signal is generated by the timer. Thus the super-priority agent is serviced initially within the short period of time.

In further aspects of the invention, subsequent requests input from a super-priority agent must be serviced after the loop period of time. Only an initial request from the super-priority agent must be serviced within the short period of time being less than the loop period of time. Thus only initial and not subsequent requests from the super-priority agent must be serviced in the short period of time.

In still further aspects a next-round signal is generated by the priority arbiter after all non-real-time agents have been serviced or when the timer reaches the predetermined timeout value. The next-round signal activates the fixed sequencer to begin a next arbitration round to grant access to the shared resource to each of the real-time agents in the predetermined sequence.

In still further aspects the shared resource is a shared memory. The shared memory stores a communications buffer accessed by the super-priority agent. The shared memory also stores at least one frame buffer of an image for display to a user and an audio buffer of audio samples for audio playback to the user.

BRIEF DESCRIPTION OF THE DRAWINGS

FIG. 8 shows arbitration slots for real-time agents with a low-latency super-priority requester and a final slot for all non-real-time agents.

FIG. 9 highlights how the non-real-time time-out period is adjusted as graphics, audio, or communications modes are changed.

FIG. 10 shows that all real-time agents are serviced within a time of $T_{LOOP}$.

DETAILED DESCRIPTION

Figure 1:
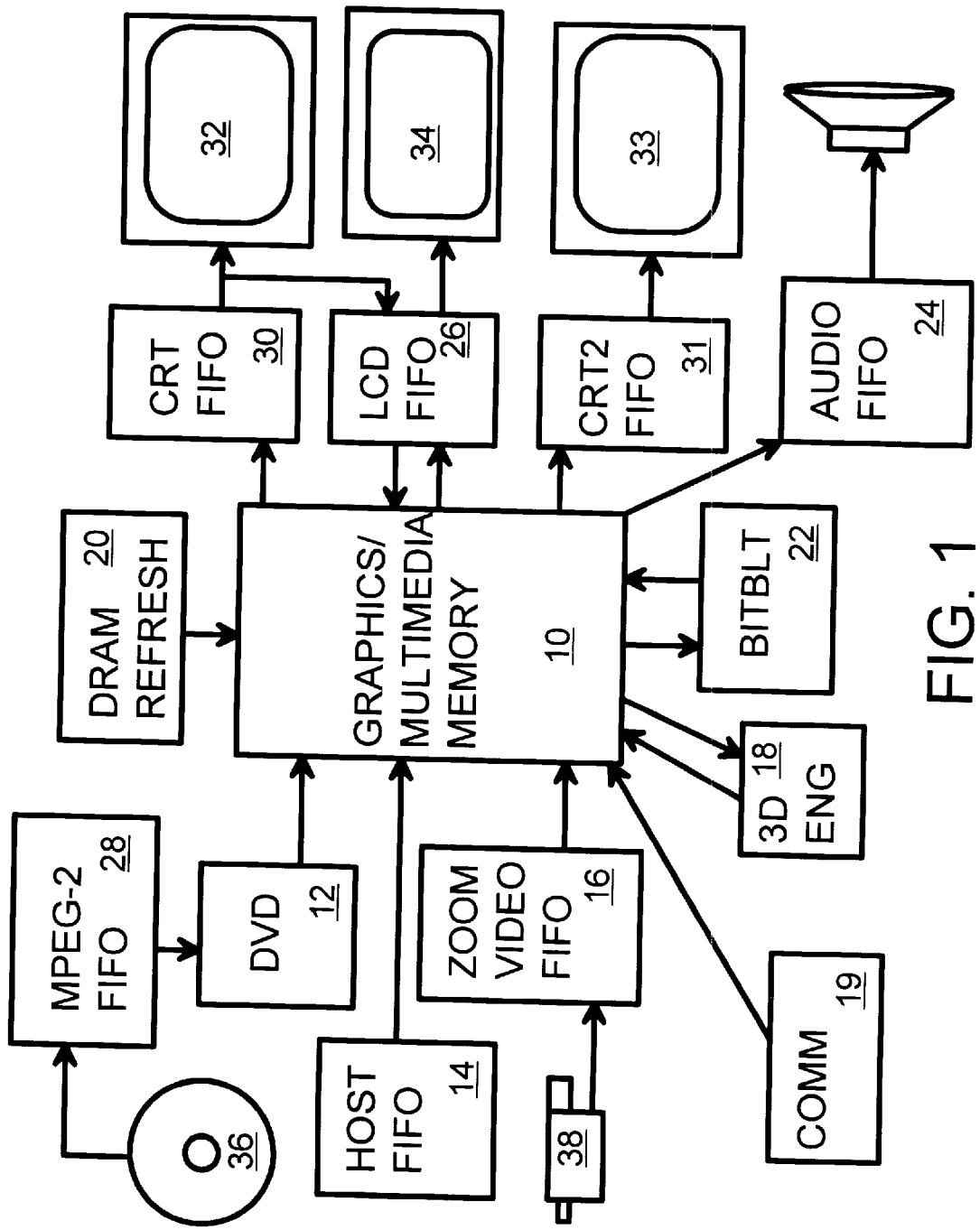
FIG. 1 is a diagram of a graphics memory shared by multiple multimedia and communications agents.
Figure 2:
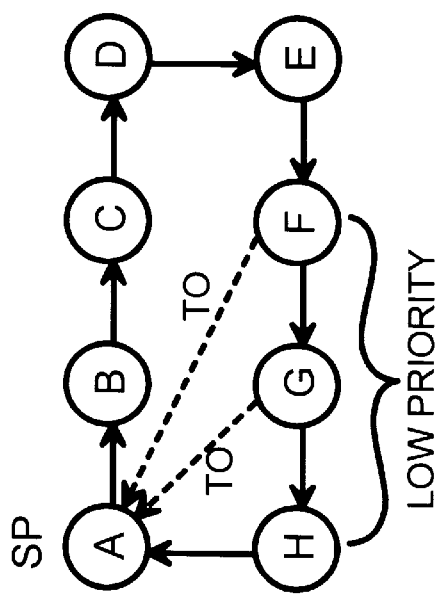
FIG. 2 is a diagram of a fixed arbitration loop with a super-priority agent.

The present invention relates to an improvement in low-latency arbitration. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventors have realized that the low latency for a communications device is much shorter than the full arbitration loop when multiple multimedia agents access a shared resource such as a shared multimedia memory. Reducing the length of the loop could reduce latency, but also reduces bandwidth to the other multimedia agents. Instead, the inventors have realized that low latency can be achieved if the super-priority agent is allowed to enter the arbitration loop at any point in the loop. Then the super-priority agent does not have to wait for the beginning of the next loop. Latency is thus reduced.

The inventors have further realized that only the initial latency is critical for communications devices. Once the call is established, then the moderate bandwidth is met by a sufficiently large FIFO that is serviced once in the arbitration loop. While the super-priority agent can initially enter the loop at any point, once the loop is entered, the super-priority agent uses a single, fixed position in the arbitration loop. Thus subsequent latency is longer. Only initial latency is reduced. Once a call ends, the communications device stops arbitration for some period of time, dropping out of the arbitration loop. When a subsequent call is received, low latency is again achieved by allowing the super-priority agent to again enter the loop at any point.

PARENT APPLICATION DESCRIBES 2 KINDS OF AGENTS

The parent application describes a shared multimedia memory that is accessed by many different agents. While many different kinds of individual agents must have access, these agents can be split into two basic types: real-time and non-real-time. The real-time agents must be serviced regularly within a set period of time. While some of the real-time agents may have higher priority than others, all must be serviced regularly or failures such as image or audio distortion can occur.

The present invention extends the concepts of the parent application by allowing a third kind of agent: the super-priority agent. The super-priority agent is initially serviced with a low latency. Such super-priority arbitration is ideal for communications agents.

The inventors have realized that the non-real-time agents are also important to system performance. For example, 3D rendering does not have to access the multimedia memory on a fixed schedule, but performance suffers when the 3D engine is not provided with a sufficient bandwidth. Objects may not be rendered or updated as quickly as desired, making video games or clips jerky or less responsive to user input. Thus the bandwidth provided to these non-real time agents should be maximized. Some of these non-real-time agents may have higher priority than others.

The inventors use a hybrid arbitration scheme using both fixed round-robin and priority arbitration. The real-time agents are provided a fixed loop time, using a fixed round-robin arbiter. The non-real-time agents are given one fixed slot of this round-robin arbitration, the final time slot. All non-real-time agents must share this one slot.

A timeout is provided to limit the non-real time agents, but no timeout restricts the real-time agents. All real-time agents are given whatever time is needed to fill their FIFOs, up to a maximum time for each agent. After the last real-time agent is done, the timeout timer is started. The non-real-time agents are serviced in priority order until the timer reaches the timeout. Then the first real-time agent begins the next round.

The timeout corresponds to the maximum length of the final time slot. This is a timeout for non-real-time agents, not for the entire arbitration loop. A non-real-time timeout is used to limit the non-real-time agents, allowing the real-time agents to regain memory access within a fixed period of time. Loop skew is avoided by timing only the non-real-time agents.

PHANTOM SLOTS ADDED FOR SUPER-PRIORITY AGENT—FIG. 4

Figure 4:
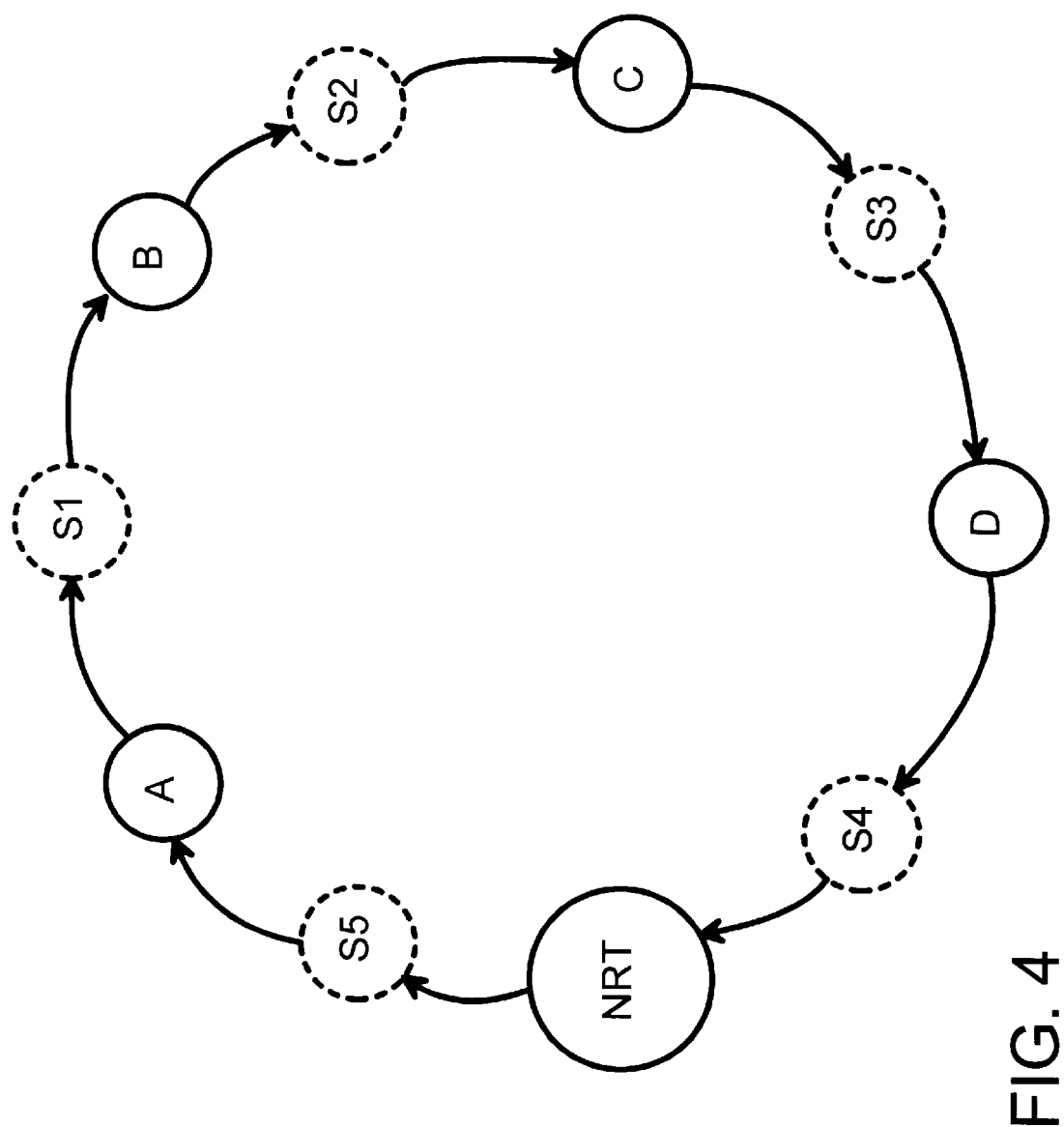
FIG. 4 is an arbitration loop diagram with phantom slots for use by a super-priority agent.

FIG. 4 is an arbitration loop diagram with phantom slots for use by a super-priority agent. High-priority real-time agents A, B, C, D are assigned a fixed slot in the arbitration loop. Other non-real-time (NRT) agents share a remaining NRT slot that is terminated after a timeout.

Phantom slots S1, S2, S3, S4, S5 are inserted between the RT slots A, B, C, D and the NRT slot. These phantom slots are shown with dashed outlines. Phantom slots are skipped when the super-priority agent is inactive, so that the arbitration loop collapses back to the A-B-C-D-NRT loop of the parent application.

However, when a super-priority SP request occurs, the next phantom slot is used to service the super-priority agent. This phantom slot becomes the fixed slot for the super-priority agent. Other phantom slots are disabled. On each subsequent arbitration round, the super-priority agent is serviced at this fixed phantom slot while the other phantom slots are skipped.

For example, when the super-priority request is received during slot C, the next phantom slot S3 services the super-priority agent. Phantom slots S4, S5, in the current round and phantom slots S1, S2 in the next round are skipped. Then the super-priority agent is again serviced in the next S3 slot. Phantom slots S4, S5, S1, S2 continue to be skipped while the super-priority agent is serviced during each S3 slot.

Once the super-priority agent stops requesting, the S3 phantom slot is released. After some time the super-priority agent again makes an initial request and is serviced in the next phantom slot. For example, the next initial request occurs during the NRT slot. The super-priority agent is serviced in the following phantom slot, S5. Then agents A, B, C, D, and NRT agents are serviced before the super-priority agent is again serviced in slot S5. Thus phantom slots S1, S2, S3, S4 are skipped.

A low latency is achieved for the first request of each series of super-priority requests for a communications session. Since the initial super-priority request is serviced by the next phantom slot, the initial latency is the remaining time for the current agent. The maximum latency is the service time for the slowest agent, or the timeout for the NRT agents.

Latency for subsequent super-priority requests in the same session is longer. The secondary latency is the loop time, Tloop. Thus only the initial latency is reduced.

HYBRID ARBITRATION—FIG. 5

Figure 5:
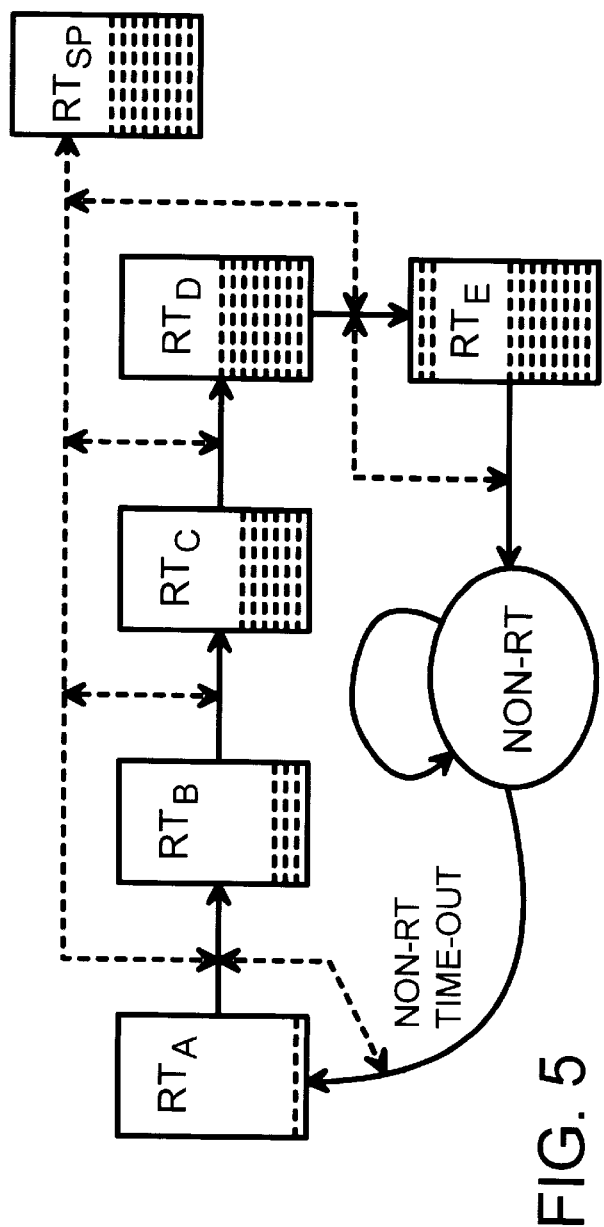
FIG. 5 illustrates hybrid arbitration using fixed round-robin arbitration for real-time agents, low initial-latency for a super-priority agent, and time-limited priority arbitration for non-real-time agents.

FIG. 5 illustrates hybrid arbitration using fixed round-robin arbitration for real-time agents, low initial-latency for a super-priority agent, and time-limited priority arbitration for non-real-time agents. Real-time agents A, B, C, D, E each have FIFOs that must be filled during each arbitration loop. Real-time agent A fills its FIFO before relinquishing access to agent B. Agent B then fills its FIFO before agent C is given the opportunity to fill its FIFO. Real-time agents D and E likewise fill their FIFOs when their turn in the arbitration loop occurs.

When a FIFO is full or nearly full, the real-time agent may need little or no service time. The agent can be skipped and serviced during the next arbitration-service loop.

The super-priority agent also has its own FIFO, a $RT_{SP}$ FIFO. This SP FIFO is serviced at any point in the arbitration loop, depending on when the initial SP request is received. For example, when the super-priority request is received while FIFO C is being filled, the SP FIFO is filled after FIFO C is filled, but before FIFO D is filled. The SP FIFO is filled once during each arbitration loop, between FIFOs C and D.

Each of the real-time agents A–E is allocated a fixed slot in the arbitration sequence. A final slot is assigned to non-real-time agents. This final slot is shared by all the non-real-time agents. The non-real-time agents are serviced in priority order during this final time slot.

The length of time for the final slot is fixed by a timer. The timer is triggered once the last real-time agent completes its memory access. Once the timer reaches a predetermined timeout, the final slot ends and the first real-time agent is serviced, beginning the next round of arbitration. The non-real-time agent being serviced when the timeout occurs must immediately stop accessing the memory.

Figure 6:
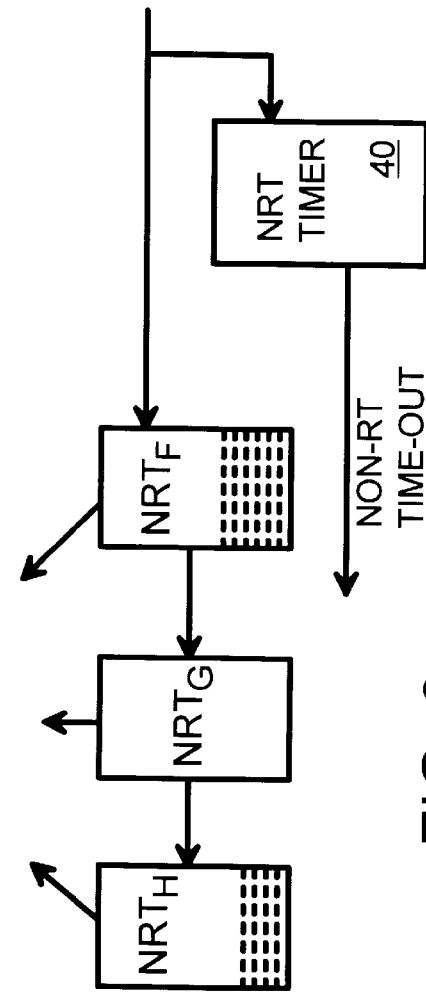
FIG. 6 is a detail of the final time-slot for the priority-arbitrated non-real-time agents.

FIG. 6 is a detail of the fnal time-slot for the priority-arbitrated non-real-time agents. Once the last of the real-time agents has completed its service time-slot, timer 40 is triggered. Timer 40 is periodically incremented or decremented until the time elapsed equals the length of the final time-slot. Then the non-real-time (NRT) timeout is generated by timer 40, ending the time-slot for the non-real-time agents.

Once timer 40 has been triggered, a priority arbiter determines which of the non-real-time agents requesting memory access has the highest priority. This highest-priority non-real-time agent is serviced first. In FIG. 6, agent F is serviced first. Once NRT agent F has completed, such as by filling its FIFO, the next-highest-priority NRT agent is selected. In this example, NRT agent G is given access. Agent G has no FIFO, but merely performs some number of reads or writes of the shared multimedia memory;

The next NRT agent in priority order is NRT agent H, which begins to fill its FIFO. Before NRT agent H can finish, timer 40 signals the NRT timeout, and NRT agent H must stop, leaving its FIFO only partially filled.

In other examples, the NRT timeout could occur when servicing NRT agent F or G, before agent H is granted access. All of the NRT agents could be serviced before the NRT timeout, in which case the next round of arbitration can begin early with real-time agent A, after the phantom slot S5 for the super-priority agent.

FIXED AND PRIORITY ARBITRATORS CASCADED–FIG. 7

Figure 7:
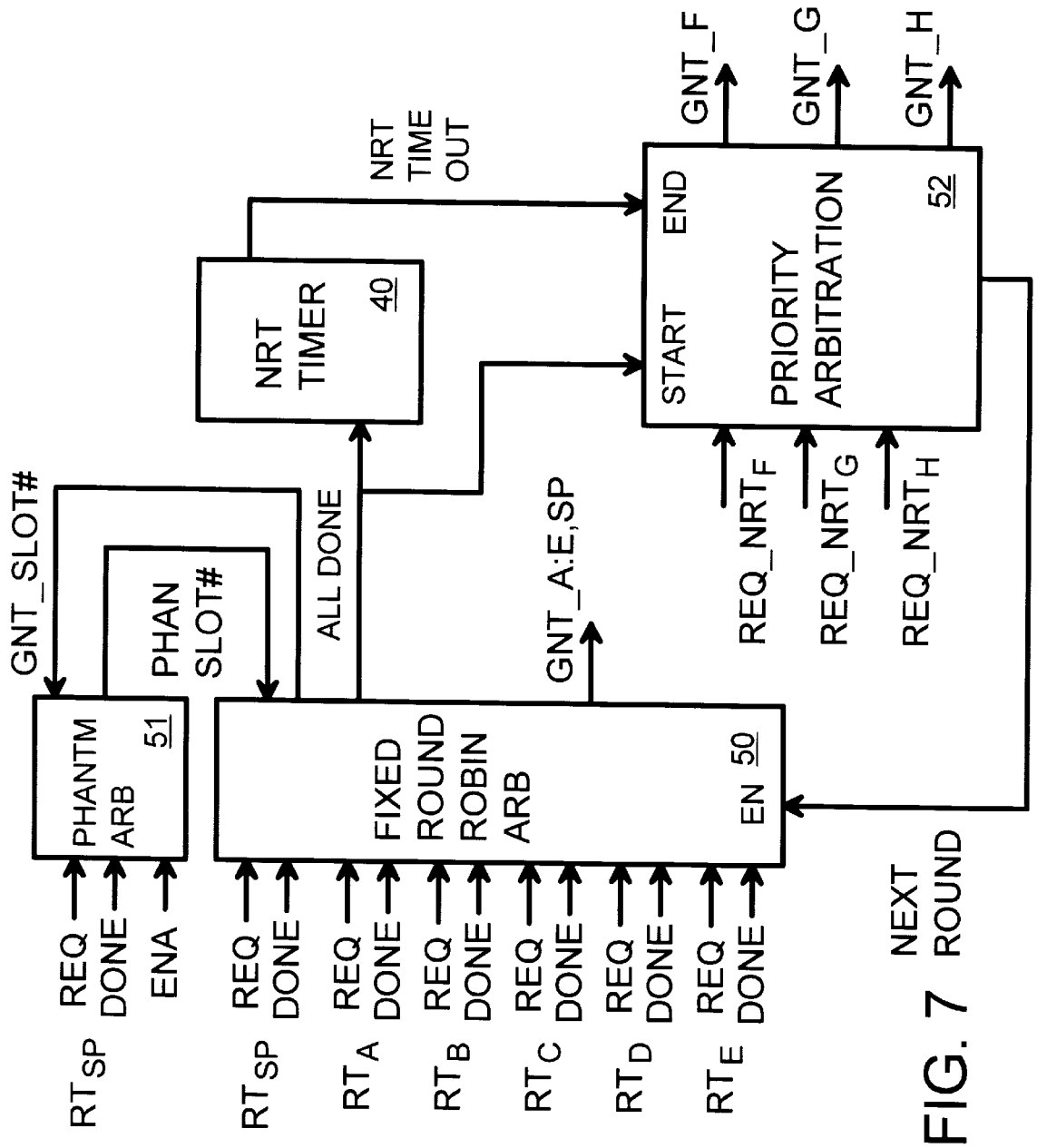
FIG. 7 is a diagram of a fixed round-robin arbiter with phantom-slot super-priority arbitration that is cascaded with a priority arbiter for servicing both real-time and non-real-time agents.

FIG. 7 is a diagram of a fixed round-robin arbiter with phantom-slot super-priority arbitration that is cascaded with a priority arbiter for servicing both real-time and non-real-time agents. Fixed arbiter 50 performs round-robin arbitration among real-time agents A–E. During a first arbitration slot, if real-time agent A has asserted its request line, fixed arbiter 50 grants agent A access to the multimedia memory. Once agent A has finished filling its FIFO, it asserts its DONE signal to fixed arbiter 50. Then fixed arbiter 50 grants access to agent B in the second slot if agent B has asserted its request line. Agent B retains control of the multimedia memory until it finishes and asserts its DONE signal.

Fixed arbiter 50 grants access to real-time agents C, D, E in a similar manner for the third, fourth, and fifth slots in the arbitration loop. Each real-time agent retains mastership of the memory until it signals DONE. Fixed arbiter 50 does not preempt real-time agents but allows them as much time as necessary to fill their FIFOs. The amount of time for each arbitration slot thus varies, depending on the agent's service load. The DONE signal from the agent indicates when fixed arbiter 50 is clocked to the next arbitration slot.

Phantom arbiter 51 and fixed arbiter 50 grant access to the super-priority agent SP during a phantom slot. The super-priority agent requests access by asserting its REQ line to fixed arbiter 50. Fixed arbiter 50 indicates which slot is active using the GNT_SLOT# signal bus to phantom arbiter 51. Slots A, B, C, D, E, or NRT may be indicated by GNT_SLOT#. Phantom arbiter 51 then determines the next phantom slot (S1, S2, S3, S4, or S5) after the current GNT_SLOT# and sends this phantom slot on bus PHAN_SLOT# back to fixed arbiter 50. Fixed arbiter 50 then grants access to super-priority agent SP by asserting its grant line upon completion of the current slot's request.

Once the super-priority agent finishes being serviced, it asserts DONE to fixed arbiter 50 and to phantom arbiter 51. Then the normal sequence continues from fixed arbiter 50. Fixed arbiter 50 inserts the phantom slot selected by phantom arbiter 51 and signaled bus PHAN_SLOT#. During the next arbitration loop, access is granted to the super-priority agent during the phantom slot PHAN_SLOT#. The other phantom slots are skipped by fixed arbiter 50.

Once the communications session processed by the super-priority agent completes, it de-asserts the enable signal ENA to phantom arbiter 51. Phantom arbiter 51 then nulls the bus PHAN_SLOT#. Fixed arbiter 50 no longer inserts the phantom slot so that SP requests are no longer granted until the next communications session begins with the super-priority agent activating its REQ and ENA signals.

Once the last real-time agent E has finished its memory service by signaling DONE, fixed arbiter 50 enters the final arbitration slot for the non-real-time agents. Fixed arbiter 50 passes control to priority arbiter 52. Timer 40 is triggered, and begins timing the length of the final arbitration slot for all of the non-real-time agents. Fixed arbiter 50 becomes idle until the end of the final arbitration slot is signaled by priority arbiter 52, enabling fixed arbiter 50 to begin the next round of arbitration with agent A.

Priority arbiter 52 receives request lines from each of the non-real-time agents F, G, H, and chooses the highest-priority agent of the non-real time agents. The chosen agent is granted access by priority arbiter 52 asserting the grant signal for that agent. Once the agent has completed its memory service, it can de-assert its request line, allowing priority arbiter 52 to choose then next-highest-priority agent of the remaining real-time agents making requests. The grant line for the newly-chosen agent is asserted while grant line for the finished agent is de-asserted.

Alternatively, priority arbiter 52 can stop or suspend the current agent when a higher-priority agent makes a new request, or after some predetermined period of time. Priority arbiter 52 de-asserts the grant line for the current agent, waits for the agent to respond by de-asserting its request line, and then asserts the grant line for a different agent.

After all requesting non-real-time agents have been serviced, priority arbiter 52 ends the final slot by signaling the next round of arbitration to fixed arbiter 50. However, when timer 40 has reached its terminal count, the amount of time for the final time slot has been exceeded. Timer 40 signals the time-out to non-real-time priority arbiter 52. Priority arbiter 52 then de-asserts all grant lines. Once the non-real-time agents have relinquished access to the multimedia memory, and have de-asserted their request lines, priority arbiter 52 signals the next round to fixed arbiter 50. Priority arbiter 52 then remains idle until the final slot of the next arbitration round is signaled by fixed arbiter 50 outputting the ALL_DONE signal.

LOW LATENCY FOR SUPER-PRIORITY AGENT—FIG. 8

FIG. 8 shows arbitration slots for real-time agents with a low-latency super-priority requestor and a final slot for all non-real-time agents. Real-time agents A-E occupy the first five permanent slots in the arbitration loop. The amount of time for each real-time-agent slot can vary from agent to agent. Some agents with small FIFOs require a shorter time slot than others with larger FIFOs. The actual time used in a slot can also vary from round to round. For example, display agents may need little or no time to fill FIFOs during vertical retrace periods.

The phantom slot following a super-priority request is used for the super-priority agent, providing a low latency. In the example of FIG. 8, a super-priority request is received during slot A, while RT agent A is being serviced. Once agent A finishes, a phantom slot for the super-priority agent is inserted. During slot S1 (time $T_{SP}$) the super-priority agent is serviced. The latency is less than the time for slot A, $T_A$, which is much less than the entire loop time $T_{LOOP}$.

The time periods shown in FIG. 8 are the maximum times needed, the worst-case time needed for each real-time agent. The worst-case slot time is calculated from the size of the FIFO, the memory's bandwidth to fill the FIFO, and perhaps the rate that data is emptied from the FIFO, which depends on the graphics or audio mode in use. These maximum time periods are designated $T_{SP}$, $T_A$, $T_B$, $T_C$, $T_D$, and $T_E$.

A spreadsheet program can calculate the necessary sizes of the FIFOs based on the variable $T_{LOOP}$ and other constraints such as the memory bandwidth, the number of real-time agents and their memory bandwidth requirements, the number of cycles desired for NRT agents, the worst case modes, and other architectural characteristics such as clock frequency, memory access time, DRAM page size, page break penalty, and synchronization time. Given the memory bandwidth and the agent bandwidth requirements, $T_{LOOP}$ and the FIFO sizes can be calculated such that no FIFO will underflow. In addition, there may be more than one worst-case mode, and not all agents need to be involved in the calculations. The configuration of each worst case mode depends on the user specification.

The final arbitration slot is used for all non-real-time agents (F, G, H). The maximum time for this slot is determined by the NRT timer, and is designated TNRT. Upon completion of the final slot, the next arbitration round begins with agent A—s slot.

NRT TIMEOUT ADJUSTED AS GRAPHICS & AUDIO MODES CHANGE—FIG. 9

FIG. 9 highlights how the non-real-time time-out period is adjusted as graphics, audio, or communications modes are changed. When a communications session begins or ends, the communications mode changes, increasing or decreasing the demands on the shared memory. The user or programs can change the graphics mode of the PC, such as changing from VGA to SVGA resolution, changing the color depth, or enabling a second display. Graphics modes with more pixels, or more colors per pixel, require a higher bandwidth. Since their FIFOs are depleted more quickly, they require more time to fill the FIFOs. The maximum time for the arbitration slot must be increased to account for the mode change.

In FIG. 9, the agent for the second display, real-time agent B, is enabled for a higher-bandwidth mode. The maximum time for agent B, $T_B$, is increased by X. The overall maximum arbitration-loop period $T_{LOOP}$ needs to be kept constant so that other agents are serviced with the same frequency. To maintain a constant $T_{LOOP}$ the non-real-time slot is reduced. $T_{NRT}$ is reduced by X, keeping the loop period constant. When agents do not need as much time as the maximums, then the actual loop time is less than $T_{LOOP}$.

When a communications session ends, $T_{SP}$ is no longer needed, and $T_{NRT}$ can be increased by $T_{SP}$. Then when the next communications session begins, $T_{SP}$ is again needed, and $T_{NRT}$ is reduced by $T_{SP}$ to compensate. Alternately, $T_{SP}$ can be included in $T_{LOOP}$ at all times when an incoming call may be received.

As more graphics-intensive modes are used, less bandwidth is available for non-real-time agents. Likewise, audio modes with more samples per second, or with more audio channels can also decrease the remaining bandwidth for non-real-time agents. Faster PCs or faster multimedia memories can be used to increased the relative $T_{LOOP}$, and the remaining bandwidth for non-real-time agents.

The adjustment for the NRT timeout is preferably calculated by software or firmware such as the graphics or multimedia drivers. The driver is invoked when the graphics mode is changed. The driver re-calculates the maximum slot times for the real-time agents, and then adjusts the NRT timeout to maintain a constant loop time. The new NRT timeout period is written to a register that loads the NRT timer with a count value after every arbitration loop. Thus only the NRT timeout value needs to be written to the multimedia hardware. The timeout value for various modes can also be precalculated by the spreadsheet program. During run time, either hardware or software can be used to detect the mode and select the appropriate timeout value.

ALL RT AGENTS SERVICED WITHIN $T_{LOOP}$— FIG. 10

Figure 3:
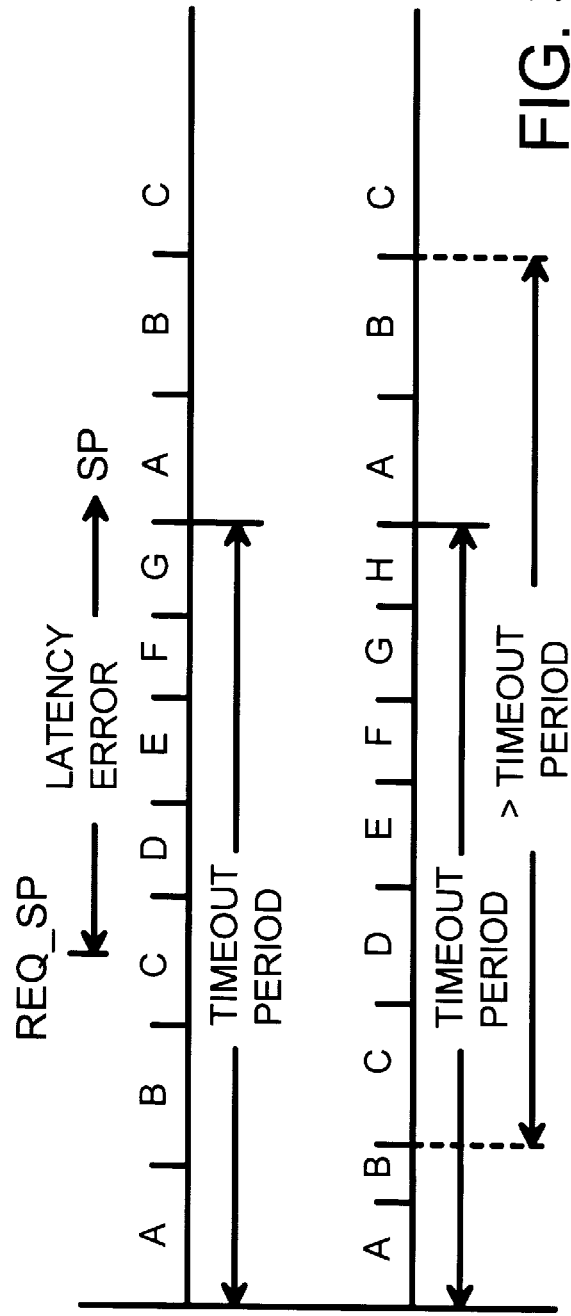
FIG. 3 shows that some agents such as a super-priority agent may not be serviced quickly enough despite a fixed-loop timeout.

FIG. 10 shows that all real-time agents are serviced within a time of $T_{LOOP}$. Loop skew could occur when some agents use less time than the maximum time available to them. In the bottom waveform of FIG. 3, short periods for agents A and B allowed the non-real-time agents to have extra time. This extended the effective loop period seen by agent C to beyond $T_{LOOP}$, possibly causing a failure.

When agents A and B use just a short period, less than their maximums allocated, the current overall loop period is shortened. The non-real-time agents are not given extra time, as in FIG. 3 when the overall loop period is constant. Instead, the slot for the non-real-time agents is kept constant, while the overall loop period is sometimes reduced.

Regardless of which phantom slot is used by the super-priority agent, only one $T_{SP}$ is included in $T_{LOOP}$. Thus providing low-latency does not occur at the expense of the loop period.

The loop period seen by agent C is no longer than $T_{LOOP}$, as FIG. 10 shows. This is because each real-time agent takes no more than its maximum time, the time to fill its FIFO. The non-real-time agents are always limited to the NRT timeout. Since these NRT agents cannot take additional time not used by the real-time agents, the overall loop period seen by any of the real-time agents is never more than $T_{LOOP}$.

Each of the FIFOs for real-time agents is sufficiently large so that a FIFO cannot become empty before the next service loop when it is filled or topped off during each loop. The maximum loop time is calculated by assuming that each of the real-time FIFOs are empty and must be filled. Some typical times are: $T_{LOOP}$=3.22us, $T_{CRT}$=0.42us, $T_{MOVIE1}$=0.68us, $T_{PANEL}$=0.42us, $T_{DUAL-HEAD-DISPLAY}$=0.66us, $T_{MOVIE2}$=0.22us, $T_{ZVP}$=0.24us, $T_{NRT}$=0.58us and $T_{SP}$=0.16 us.

ADVANTAGES OF THE INVENTION

The hybrid round-robin/priority arbitration scheme is ideal for multiple real-time and non-real time agents. The super-priority communications agent is initially responded to with a low latency that is less than the arbitration-loop time, which is the latency for the other agents.

Each of the critical real-time agents has access to a common resource within a predefined period of time ($T_{LOOP}$) to prevent underflow failures. Many multimedia and communications agents share access to a common multimedia memory. The common multimedia memory is used for multiple frame buffers, each being read by a high-priority agent. The multimedia memory also is read by a high-priority audio agent for real-time audio playback, and lower-priority non-real time agents such as 3D engines. Performance of lower-priority agents that are not real-time agents is nevertheless maximized.

The shared memory allows flexible memory allocation as graphics, audio, and multimedia modes change. Communications rates can change with line conditions or the type of data being transmitted. Graphics demands can change as additional displays are enabled, or as higher-color or resolution modes are employed. Video playback or 3D can increase bandwidth demands of the multimedia memory, as can video teleconferencing. Digital audio with multiple channels or higher sampling rates can also demand more bandwidth, and more memory space allocated from the multimedia memory. Sharing a single multimedia memory allows the most flexible and efficient use of the memory for any combination of modes in use. These modes can change quickly as multimedia applications are launched and terminated.

The invention facilitates optimizing for different operating modes by adjusting one timeout value rather than adjusting agent FIFO thresholds as in other schemes. Initial latency to one agent is minimized by allowing that agent to enter the loop at any point, rather than waiting for the beginning of the loop.

Incorporation of a super-priority agent facilitates quality of service (QoS) required in most communications applications. By controlling the enable line, the super-priority agent can enter and exit the arbitration loop any time and still get low-latency service. The invention also facilitates incorporation of higher-level priority arbitration of multiple super-priority agents, if needed, without impacting normal loop function.

ALTERNATE EMBODIMENTS

Several other embodiments are contemplated by the inventors. For example, other handshake signals can be used for the agents and arbiters. Shared lines such as open-collector (drain) signals can be used for handshake signals such as a common busy line. A watchdog timer can be used to halt an agent that has taken too much time. Different numbers of real-time and non-real time agents are possible, and some agents can be disabled for different graphics, audio, and communication modes. For large embedded memories, two or more memory modules or standard cells may be included within the chip. Each memory module can use an arbitrator. Each memory-arbitrator pair is equivalent to the current invention. A crossbar circuit routes agent requests to either memory module.

The next round of arbitration can also wait for the timeout, rather than begin immediately after the last NRT agent is finished. The arbitrator is then idle, waiting for NRT agent requests, until the NRT timeout. A programmable bit can be used to select either the wait-for-NRT-timeout scheme or the immediate-next-round scheme.

NRT agents can be terminated on a timeout, or when their FIFO becomes full, or by higher priority NRT agents that preempt the agent. A "parking" mode for host, 3D, and bitblt is also contemplated. In parking mode, once a NRT agent is granted, it remains granted as long as there are no other NRT agent requests. This gives a minimum turnaround time for the current agent. The host uses this feature because host accesses are random but require fast response time to improve performance.

Higher-priority agents or the super-priority agent can terminate lower-priority agents within one random memory cycle (a random cycle is 90 ns in one embodiment of the memory). Some agents need only one random cycle, so termination is not necessary. This occurs for hardware cursor, icon, or audio. A programmable bit can be included to either terminate the agent within a random cycle or wait until the request is done. Multiple communications agents are possible.

Some agents with low bandwidth requirements are also considered as NRT agents. For example, the hardware cursor and icon each need only one random cycle every 10 us, while audio requires only one cycle once every 4us. $T_{LOOP}$ is 3.22us. In this example, these agents must be the highest-priority NRT agents and the NRT timeout period must be long enough to service three random cycles. The arbiter may skip an agent if the agent does not have a memory request. It is also possible to always grant the next immediate slot, even if no request is pending. This wastes one cycle, but this implementation can run at a faster clock rate. DRAM refresh can be a real-time agent, or for fast memories with low refresh requirements, it can be a non-real-time agent.

The inventors also anticipate using a shared-memory architecture with the described memory controller and arbiter for a LAN switch. The switching fabric of the LAN switch is designed to use a store-and-forward technique. Each port has a port controller, which is the real-time agent requesting service from the shared memory. The Phantom slot is used when a given packet carries digitized voice and thus requires a high-priority service. The voice packets are small packets and appear in a burst mode.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A cascaded arbiter comprising:
    a plurality of request inputs from real-time agents that must be serviced periodically after a loop period of time;
    a plurality of request inputs from non-real-time agents that can be serviced after irregular periods of time;
    a request input from a super-priority agent that must be serviced initially after a short period of time being less than the loop period of time;
    a fixed sequencer, coupled to the plurality request inputs from the real-time agents, for granting access to a shared resource to each of the real-time agents in a predetermined sequence;
    a phantom-slot inserter, coupled to the fixed sequencer and to the request input from the super-priority agent, for inserting a phantom slot for servicing the super-priority agent into the predetermined sequence, the phantom slot being inserted after an initial request is received so that the super-priority agent is serviced initially after the short period of time being less than the loop period of time;

a final-slot signal, generated by the fixed sequencer after all real-time agents activating a request input are serviced by granting access to the shared resource;

a timer, coupled to the fixed sequencer, for counting a final period of time from activation of the final-slot signal, the timer generating a time-out signal when the final period of time counted reaches a predetermined timeout value; and a priority arbiter, coupled to the plurality of request inputs from non-real-time agents and coupled to the fixed sequencer, for granting access to the shared resource to non-real-time agents in a priority order, the priority arbiter granting access after receiving the final-slot signal from the fixed sequencer, priority arbiter not granting access after the time-out signal is generated by the timer;

whereby the super-priority agent is serviced initially within the short period of time.

2. The cascaded arbiter of claim 1 wherein subsequent requests input from a super-priority agent must be serviced after the loop period of time, wherein only an initial request from the super-priority agent must be serviced within the short period of time being less than the loop period of time, whereby only initial and not subsequent requests from the super-priority agent must be serviced in the short period of time.

3. The cascaded arbiter of claim 2 further comprising:

a next-round signal, generated by the priority arbiter after all non-real-time agents have been serviced or when the timer reaches the predetermined timeout value, the next-round signal activating the fixed sequencer to begin a next arbitration round to grant access to the shared resource to each of the real-time agents in the predetermined sequence.

4. The cascaded arbiter of claim 3 wherein the plurality of request inputs from the real-time agents and the request input from the super-priority agent each comprise:

a request signal for requesting access to the shared resource by an agent;

a done signal for indicating when the agent has completed accessing the shared resource;

wherein the fixed sequencer grants access to a next real-time agent or to the super-priority agent in the predetermined sequence after a done signal is received from a previous real-time agent in the predetermined sequence, whereby the real-time agents are not pre-emptied by the fixed sequencer.

5. The cascaded arbiter of claim 3 wherein the priority arbiter de-activates a grant signal to a current non-real-time agent that is accessing the shared resource when a higher-priority non-real-time agent or the super-priority agent activates its request line during the final period of time, whereby non-real-time agents are pre-emptable by the priority arbiter.

6. The cascaded arbiter of claim 3 wherein each of the real-time agents is serviced within no more than a maximum loop period of time, the maximum loop period of time including maximum times for each of the real-time agents to access the shared resource and the predetermined timeout value for the non-real-time agents, whereby all real-time agents are serviced within the maximum loop period of time but the super-priority agent is initially serviced within the short period of time.

7. The cascaded arbiter of claim 2 wherein the shared resource is a shared memory, the shared memory storing a communications buffer accessed by the super-priority agent.

8. The cascaded arbiter of claim 7 wherein the shared memory also stores at least one frame buffer of an image for display to a user and an audio buffer of audio samples for audio playback to the user.

9. The cascaded arbiter of claim 8 wherein the shared memory is a dynamic-random-access memory (DRAM), and wherein one of the non-real-time agents is a DRAM-refresh agent, the DRAM-refresh agent reading a different physical row in the DRAM to recharge memory cells in a row, whereby the shared memory is a DRAM refreshed by a non-real-time agent.

10. A multimedia arbiter comprising:

a shared multimedia memory for storing frame buffers and a communications buffer;

real-time agents for reading the frame buffers, the real-time agents requiring access to the shared multimedia memory periodically to prevent failures;

non-real-time agents for writing the frame buffers, the non-real-time agents able to access the shared multimedia memory after irregular periods of time without failures;

a super-priority agent for accessing the communications buffer, the super-priority agent requiring immediate access to the communications buffer for an initial request, but not requiring immediate access to the communications buffer for subsequent requests;

round-robin means, coupled to the real-time agents, for granting access to the shared multimedia memory to each of the real-time agents in a predetermined sequence, the round-robin means generating a final signal once all real-time agents have been granted access to the shared multimedia memory; and phantom means, coupled to the super-priority agent and coupled to the round-robin means, for storing a slot indicator of a current real-time agent granted access of the shared memory when the initial request from the super-priority agent is received;

wherein the round-robin means grants access to the shared multimedia memory to the super-priority agent after the current real-time agent finishes accessing the shared multimedia memory but before any other of the real-time agents are granted access;

whereby the super-priority agent is granted initial access to the shared memory with a low latency.

11. The multimedia arbiter of claim 10 further comprising:

timer means, responsive to the final signal from the round-robin means, for indicating a final time-slot, the final time-slot beginning with the final signal and ending after a predetermined delay; and priority-arbitration means, coupled to the round-robin means, for granting access to the shared multimedia memory to the non-real-time agents in a priority order, the priority-arbitration means only granting access for the non-real-time agents during the final time-slot, whereby the real-time agents are granted access in round-robin order but the non-real-time agents are granted access in priority order.

12. The multimedia arbiter of claim 11 wherein the round-robin means grants access to the shared multimedia memory to the super-priority agent for the subsequent requests in a same order following the real-time agent indicated by the slot indicator, whereby the super-priority agent is granted access in a same order as the initial request for the subsequent requests.

13. The multimedia arbiter of claim 12 wherein the super-priority agent is granted access to the shared multimedia memory only once for each round of arbitration.

14. The multimedia arbiter of claim 13 wherein an initial latency from the initial request by the super-priority agent until accessing of the shared multimedia memory is a low latency that is less than an average loop-latency from the subsequent requests by the super-priority agent until accessing of the shared multimedia memory, whereby the initial request by the super-priority agent but not the subsequent requests by the super-priority agent has the low latency.

15. The multimedia arbiter of claim 14 wherein the average loop-latency from the subsequent requests by the super-priority agent until accessing of the shared multimedia memory is a same latency as for requests from the real-time agents until accessing of the shared multimedia memory, whereby a same latency is granted to the super-priority agent for the subsequent requests as for the real-time agents.

16. The multimedia arbiter of claim 15 wherein when the initial request from the super-priority agent is received while one of the non-real-time agents is granted access by the priority-arbitration means, the slot indicator indicates the final time-slot;

wherein when the slot indicator indicates the final time-slot, the round-robin means grants access to the shared multimedia memory to the super-priority agent before a first real-time agent begins accessing the shared multimedia memory and before any other of the real-time agents are granted access, whereby the super-priority agent is granted access before the first real-time agent when the initial request is received during the final time-slot.

17. The multimedia arbiter of claim 12 further comprising:

first-in-first-out FIFOs for each of the real-time agents and for the super-priority agent, the real-time agents and the super-priority agent filling the FIFOs when granted access to the shared multimedia memory, whereby the real-time agents fill the FIFOs during each round of arbitration.

18. The multimedia arbiter of claim 17 wherein the FIFOs are sufficiently large in capacity so that they do not become empty before being serviced again.

19. A method for arbitrating access to a shared multimedia memory comprising:

receiving requests from real-time agents that must access the shared multimedia memory within a fixed period of time;

receiving an initial request from a super-priority agent that must initially access the shared multimedia memory with a lower latency than for the real-time agents;

receiving requests from non-real-time agents that can access the shared multimedia memory on an irregular basis;

at a beginning of a round of arbitration, a round-robin arbiter granting access to the shared multimedia memory to a first real-time agent;

the first real-time agent reading pixels from a frame buffer in the shared multimedia memory to a first display FIFO;

the first real-time agent generating a DONE signal to the round-robin arbiter when enough pixels have been read to fill the first display FIFO;

when the initial request from the super-priority agent is received, determining a next phantom slot immediately following a current slot that is currently granting access to the shared multimedia memory to a cur-rent real-time agent;

when the current real-time agent completes accessing the shared multimedia memory, the round-robin arbiter granting access to the shared multimedia memory to the super-priority agent;

the super-priority agent accessing a communications buffer in the shared multimedia memory and a communications FIFO;

the super-priority agent generating a DONE signal to the round-robin arbiter when enough data has been read to fill the communications FIFO;

the round-robin arbiter granting access to the shared multimedia memory to a second real-time agent;

the second real-time agent reading pixels from a second frame buffer in the shared multimedia memory to a second display FIFO;

the second real-time agent generating a DONE signal to the round-robin arbiter when enough pixels have been read to fill the second display FIFO;

the first display FIFO driving pixels to a first display showing a first image to a user while the second display FIFO driving pixels to a second display showing a second image to the user, wherein the first image and second image are different images;

the round-robin arbiter granting access to the shared multimedia memory to a third real-time agent;

the third real-time agent reading audio samples from an audio buffer in the shared multimedia memory to an audio FIFO;

the third real-time agent generating a DONE signal to the round-robin arbiter when enough audio samples have been read to fill the audio FIFO;

reading audio samples from the audio buffer and converting the audio samples to analog voltages to drive a speaker that generates sound to the user;

activating a timer once the DONE signal is received from the third real-time agent;

the timer indicating a final time-slot after the timer is activated but before the timer reaches a terminal count;

during the final time-slot, a priority arbiter selects a highest-priority agent from the requests received from the non-real-time agents;

the priority arbiter granting access to the shared multimedia memory to an initial agent when the timer is activated, the initial agent having a highest priority of the requests received from the non-real-time agents;

the initial agent writing updates to the shared multimedia memory when granted access by the priority arbiter;

the priority arbiter granting access to the shared multimedia memory to an other agents during the final time-slot, the other agents being selected in a priority order from among the remaining requests received from the non-real-time agents;

the other agents writing updates to the shared multimedia memory when granted access by the priority arbiter; and when the timer indicates an end of the final time-slot, the priority arbiter ending a grant to a non-real-time agent and signaling to the round-robin arbiter to begin a next round of arbitration, whereby the super-priority agent is granted access with a low latency of a current real-time agent access of the shared multimedia memory.

20. The method of claim 19 further comprising:

the super-priority agent generating the DONE signal to the round-robin arbiter when enough communications data have been read to fill the communications FIFO.

* * * * *